(12) United States Patent
Pratt et al.

(10) Patent No.: US 9,923,236 B2
(45) Date of Patent: Mar. 20, 2018

(54) FLUORINATED ALKALI ION ELECTROLYTES WITH CYCLIC CARBONATE GROUPS

(71) Applicant: Seeo, Inc, Hayward, CA (US)

(72) Inventors: Russell Clayton Pratt, San Mateo, CA (US); Xiao-Liang Wang, San Leandro, CA (US); Steven Lam, San Jose, CA (US); Hany Basam Eitouni, Oakland, CA (US)

(73) Assignee: Seeo, Inc., Hayward, CA (US)

( * ) Notice: Subject to any disclaimer, the term of this patent is extended or adjusted under 35 U.S.C. 154(b) by 62 days.

(21) Appl. No.: 15/148,863

(22) Filed: May 6, 2016

(65) Prior Publication Data

US 2016/0301101 A1    Oct. 13, 2016

Related U.S. Application Data

(63) Continuation of application No. PCT/US2016/026280, filed on Apr. 7, 2016.

(60) Provisional application No. 62/144,287, filed on Apr. 7, 2015.

(51) Int. Cl.

| | |
|---|---|
| *H01M 10/0565* | (2010.01) |
| *C08G 65/00* | (2006.01) |
| *H01M 10/052* | (2010.01) |
| *H01M 10/054* | (2010.01) |
| *H01M 10/0569* | (2010.01) |
| *H01M 10/0568* | (2010.01) |

(52) U.S. Cl.
CPC ...... *H01M 10/0565* (2013.01); *C08G 65/007* (2013.01); *H01M 10/052* (2013.01); *H01M 10/054* (2013.01); *H01M 10/0569* (2013.01); *H01M 10/0568* (2013.01); *H01M 2300/0034* (2013.01)

(58) Field of Classification Search
CPC ......... H01M 10/0565; H01M 10/0569; H01M 10/052; H01M 10/054; H01M 2300/0034; H01M 10/0568; C08G 65/007
See application file for complete search history.

(56) References Cited

U.S. PATENT DOCUMENTS

| | | | |
|---|---|---|---|
| 3,821,297 | A | 6/1974 | Resnick |
| 8,067,114 | B2 | 11/2011 | Kim et al. |
| 9,368,775 | B2 | 6/2016 | Visco et al. |
| 2002/0110739 | A1 | 8/2002 | McEwen et al. |
| 2002/0127475 | A1 | 9/2002 | Marchionni et al. |
| 2003/0049538 | A1 | 3/2003 | Buerger et al. |
| 2003/0108800 | A1 | 6/2003 | Barbarich |
| 2003/0181572 | A1 | 9/2003 | Tan et al. |
| 2004/0043298 | A1 | 3/2004 | Lee |
| 2004/0170901 | A1 | 9/2004 | Blau et al. |
| 2005/0287441 | A1 | 12/2005 | Passerini et al. |
| 2006/0035987 | A1 | 2/2006 | Paddison |
| 2006/0127766 | A1 | 6/2006 | Yamate |
| 2007/0178133 | A1 | 8/2007 | Rolland |
| 2008/0114143 | A1 | 5/2008 | Brothers et al. |
| 2009/0004568 | A1 | 1/2009 | Hirose et al. |
| 2009/0023038 | A1 | 1/2009 | DeSimone et al. |
| 2009/0029249 | A1 | 1/2009 | Takami et al. |
| 2009/0182087 | A1 | 7/2009 | Fudemoto et al. |
| 2011/0111308 | A1 | 5/2011 | Halalay et al. |
| 2011/0281173 | A1 | 11/2011 | Singh et al. |
| 2012/0121989 | A1 | 5/2012 | Roberts et al. |
| 2013/0063092 | A1 | 3/2013 | Yang et al. |
| 2013/0130069 | A1 | 5/2013 | Mullin et al. |
| 2013/0228950 | A1 | 9/2013 | DeSimone et al. |
| 2013/0273419 | A1 | 10/2013 | Pistorino et al. |
| 2014/0221689 | A1 | 8/2014 | Klun et al. |
| 2016/0028114 | A1 | 1/2016 | Pratt et al. |
| 2016/0093895 | A1 | 3/2016 | Du et al. |
| 2016/0211498 | A1 | 7/2016 | Kim et al. |
| 2016/0221926 | A1 | 8/2016 | Teran et al. |
| 2016/0226101 | A1 | 8/2016 | Teran et al. |
| 2016/0226102 | A1 | 8/2016 | Teran et al. |
| 2016/0226103 | A1 | 8/2016 | Teran et al. |
| 2016/0329613 | A1 | 11/2016 | Kusachi et al. |
| 2017/0117583 | A1 | 4/2017 | Matsuno et al. |

FOREIGN PATENT DOCUMENTS

| | | |
|---|---|---|
| JP | 2009206004 A | 9/2009 |
| WO | 2007142731 A2 | 12/2007 |
| WO | 2010083325 | 7/2010 |
| WO | 2011051275 A1 | 5/2011 |
| WO | 2014190278 A1 | 11/2014 |
| WO | 2014204547 A2 | 12/2014 |
| WO | 2015022229 A1 | 2/2015 |

OTHER PUBLICATIONS

Machine Translation of JP2009-206004A.
International Search Report for PCT/US16/31685, dated Aug. 16, 2016.
International Search Report for PCT/US2016/025950, dated Jun. 27, 2016.
International Search Report for PCT/US2016/030602.
International Search Report for PCT/US2016/032541.
International Search Report for PCT/US2016/033967 dated Aug 23, 2016.
Wong et al.: Nonflammable perfluoropolyether-based electrolytes for lithium batteries. PNAS. 111, 9. 3327-3331; Mar. 4, 2014. [retrieved on May 18, 2016}. Retrieved from the Internet. <URL: http://www.pnas.org/contentl111/9/3327.full.pdf>. entire document.
Smart. "Improved performance of lithium-ion cells with the use of fluorinated carbonate-based electrolytes," Journal of Power Sources 119-121 (2003) 359-367.

*Primary Examiner* — Cynthia K Walls
(74) *Attorney, Agent, or Firm* — R'Sur Popowich Caron

(57) ABSTRACT

Perfluoropolyether electrolytes terminated with polar substituents such as cyclic carbonates show enhanced ionic conductivities when formulated with lithium bis(trifluoromethane)sulfonimide, making them useful as electrolytes for lithium cells.

8 Claims, No Drawings

FLUORINATED ALKALI ION ELECTROLYTES WITH CYCLIC CARBONATE GROUPS

CROSS-REFERENCE TO RELATED APPLICATIONS

This application is a continuation of International Patent Application Number PCT/US16/26280, filed Apr. 6, 2016, which, in turn, claims priority to U.S. Provisional Patent Application 62/144,287, filed Apr. 7, 2015, both of which are incorporated by reference herein.

BACKGROUND OF THE INVENTION

Field of the Invention

This invention relates generally to electrolytes for use in electrochemical cells that employ alkali metals, and, more specifically, to fluorinated electrolytes for use in lithium-containing batteries.

Batteries based on lithium ion transfer work best with electrolytes that have high ionic conductivities and high stabilities. High ionic conductivities are useful because they facilitate ionic transfer, resulting in high power and low polarization. Highly stable batteries are those that are non-flammable and do not undergo undesired reactions with either anode or cathodes.

Perfluoropolyethers terminated with methoxycarbonyl groups have been reported as lithium ion electrolytes when formulated with lithium bis(trifluoromethane)sulfonimide. These electrolytes were reported to have excellent fire resistance and high lithium ion transference, though the ionic conductivities were not particularly high at about $10^{-5}$ S cm$^{-1}$ at 80° C.

What is needed is an electrolyte that provides high lithium ion transference, excellent stability and high ionic conductivities to realize the full potential of lithium batteries that employ them.

SUMMARY

In the embodiments of the invention, as disclosed herein, an electrolyte is a mixture that includes perfluoropolyethers that have either one or two terminal cyclic carbonate groups and an alkali metal salt. The alkali metal salt can be a lithium salt, a sodium salt, a potassium salt, or a cesium salt. The salt can make up between 5 and 30 wt % of the electrolyte composition.

The perfluoropolyethers can be either of the following:

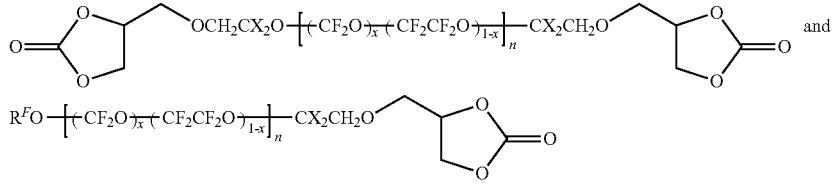

wherein x is the mole fraction of difluoromethyleneoxy groups in the perfluoropolyether, and x ranges between 0 and 1; 1-x is the mole fraction of tetrafluoroethyleneoxy groups in the perfluoropolyether, and 1-x ranges between 0 and 1; n is the average total number of randomly co-distributed difluoromethyleneoxy and tetrafluoroethyleneoxy groups in the perfluoropolyether and n ranges between 1 and 50; X is either hydrogen or fluorine; and $R^F$ is a perfluorinated C1-C8 straight or branched alkyl group.

In another embodiment of the invention, an electrochemical cell has an anode, a cathode, and an electrolyte, as described above, between the anode and the cathode. The electrolyte provides ionic communication between the anode and the cathode. The anode may be made of graphite, lithium titanante, silicon and/or a silicon alloy. The cathode may be made of a material such as nickel cobalt aluminum oxide (NCA), nickel cobalt manganese (NCM), LiCoO$_2$, LiFePO$_4$, LiNiPO$_4$, LiCoPO$_4$, and LiMn$_2$O$_4$ particles, and any combination thereof.

DETAILED DESCRIPTION

The aforementioned needs are satisfied by the process of the present invention which describes perfluoropolyether electrolytes terminated with cyclic carbonate substituents such as, 4-methyl-1,3-dioxolan-2-one (propylene carbonate groups), which show enhanced ionic conductivities when formulated with lithium bis(trifluoromethane) sulfonimide, making them useful as lithium cell electrolytes.

Examples of fluoropolymers and perfluoropolymers include but are not limited to fluoropolyethers and perfluoropolyethers, poly(perfluoroalkyl acrylate), poly(perfluoroalkyl methacrylate), polytetrafluoroethylene, polychlorotrifluoroethylene, and polyvinylidene fluoride.

Examples of perfluoropolyethers include but are not limited to polymers that include a segment such as a difluoromethylene oxide, tetrafluoroethylene oxide, hexafluoropropylene oxide, tetrafluoroethylene oxide-co-difluoromethylene oxide, hexafluoropropylene oxide-co-difluoromethylene oxide, or a tetrafluoroethylene oxide-cohexafluoropropylene oxide-co-difluoromethylene oxide segments and combinations thereof.

As stated above, perfluoropolyethers terminated with methoxycarbonyl (MC) groups have been reported as lithium ion electrolytes when formulated with lithium bis (trifluoromethane)sulfonimide. Examples of these are shown below.

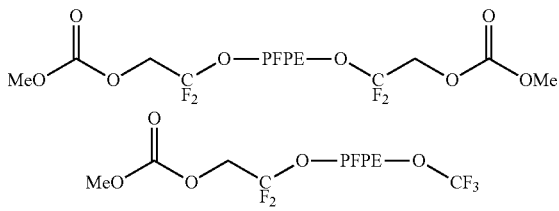

-continued

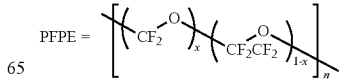

The methyl carbonate termini of these polymers enhance the solubility of lithium salt in the electrolyte when compared to the diol precursors. However, linear carbonate groups do not make an inherently good solvent for salts: as analogues, solvents such as dimethyl carbonate and diethyl carbonate have almost no ability to dissolve lithium salts. Therefore it is likely that other functional groups may provide better salt solubilities and higher ionic conductivities.

Some new materials made from perfluoropolyethers terminated with structures significantly different from the methyl carbonate group have been synthesized and have been found to provide higher ionic conductivities than comparable methyl carbonate-terminated perfluoropolyethers. This represents a new class of compounds that can be especially useful as lithium ion electrolytes.

This new class of compounds can be generalized as either of the following chemical structures, according to an embodiment of the invention. The first is terminated by a cyclic carbonate group at both ends. The second is terminated by a cyclic carbonate group at one end.

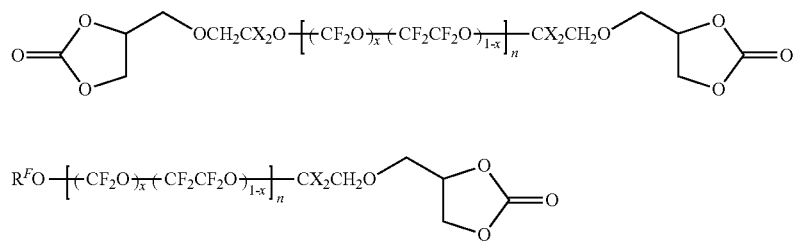

wherein x (0≤x≤1) is the mole fraction of difluoromethyleneoxy groups in the perfluoropolyether, 1-x (0≤x≤1) is the mole fraction of tetrafluoroethyleneoxy groups in the perfluoropolyether, n (1≤n≤50) is the average total number of randomly codistributed difluoromethyleneoxy and tetrafluoroethyleneoxy groups in the perfluoropolyether, and X is either H or F. $R^F$ is a perfluorinated C1-C8 straight or branched alkyl group.

In one embodiment of the invention, such structures incorporate 6-membered cyclic carbonate rings:

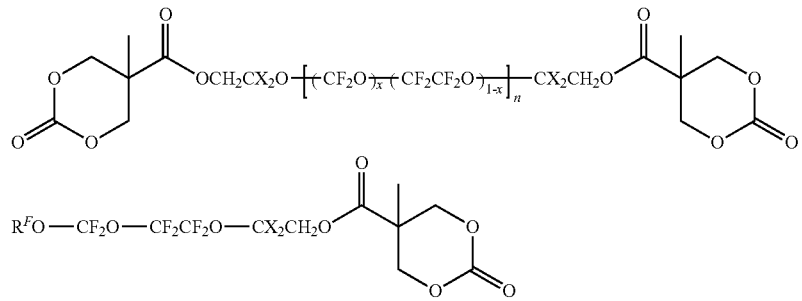

wherein x (0≤x≤1) is the mole fraction of difluoromethyleneoxy groups in the perfluoropolyether, 1-x (0≤x≤1) is the mole fraction of tetrafluoroethyleneoxy groups in the perfluoropolyether, n (1≤n≤50) is the average total number of randomly codistributed difluoromethyleneoxy and tetrafluoroethyleneoxy groups in the perfluoropolyether, and X is either H or F. $R^F$ is a perfluorinated C1-C8 straight or branched alkyl group.

Salts that can be used in the embodiments of the invention include, but are not limited to, alkali metal salts such as lithium salts, sodium salts, potassium salts, and cesium salts. Examples of lithium salts include, but are not limited to, $LiPF_6$, $LiBF_4$, Li(BOB), $LiClO_4$, LiBETI, and LiTCB. Concentration of alkali metal salts in the electrolytes disclosed herein range from 5 to 50 wt %, 5 to 30 wt %, 10 to 20 wt %, or any range subsumed therein.

The linear carbonate group is not inherently strongly polar and its presence does not enhance the solubility of salts, a property crucial for electrolytes. Incorporation of other more polar groups, such as cyclic carbonate groups, imparts a higher polarity and results in better salt solubility. Polarity refers to a separation of electric charge leading to a molecule or its chemical groups having an electric dipole or multipole moment. Polar molecules interact through dipole-dipole intermolecular forces and hydrogen bonds. Molecular polarity is dependent on the difference in electronegativity between atoms in a compound and the asymmetry of the compound's structure. Polarity underlies a number of physical properties including surface tension, solubility, and melting and boiling-points. Polar groups can also facilitate dissociation of lithium salts in an electrolyte; the better the dissociation of lithium salts, the higher the ionic conductivity in the electrolyte.

The terminal cyclic carbonate groups are similar to those of the small molecule ethylene carbonates. Constraint of the carbonate group in a cyclic ring has a dramatic effect on its properties, as can be seen when comparing the physical properties of small molecule cyclic carbonates as compared to acyclic carbonates:

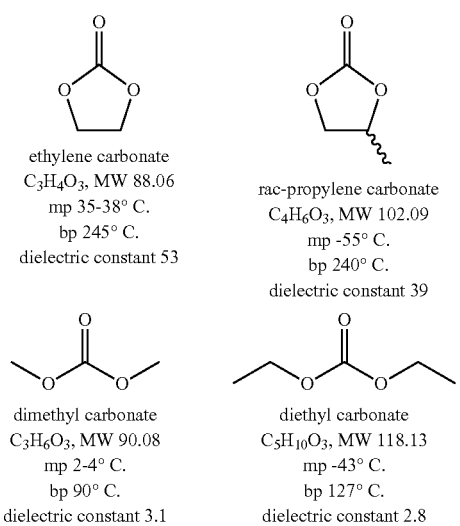

ethylene carbonate
C₃H₄O₃, MW 88.06
mp 35-38° C.
bp 245° C.
dielectric constant 53 rac-propylene carbonate
C₄H₆O₃, MW 102.09
mp -55° C.
bp 240° C.
dielectric constant 39 dimethyl carbonate
C₃H₆O₃, MW 90.08
mp 2-4° C.
bp 90° C.
dielectric constant 3.1 diethyl carbonate
C₅H₁₀O₃, MW 118.13
mp -43° C.
bp 127° C.
dielectric constant 2.8

The much higher boiling points and dielectric constants for the cyclic carbonates demonstrate that cyclization causes physical properties to change significantly. The properties of the cyclic carbonate-terminated perfluoropolyethers may then be expected to differ measurably from those of linear carbonate-terminated perfluoropolyethers, especially those properties pertaining to the solubility and transport of dissolved lithium salts.

Appending 5-membered cyclic carbonate termini onto perfluoropolyether precursors involves a particularly different methodology from that reported for the synthesis of linear carbonate-terminated perfluoropolyethers. In one arrangement, the method involves a two-step procedure of first reacting the alcoholic endgroups with epichlorohydrin to form an oxirane intermediate, followed by a halide-catalyzed reaction with carbon dioxide to form the 5-membered cyclic carbonate (see Examples). The suggested 6-membered cyclic carbonate termini are incorporated via an ester linkage, which is distinct from the carbonate functional group.

The cyclic carbonate-terminated perfluoropolyether compounds maintain the advantages of using perfluoropolyethers as electrolytes that have been previously cited, including: low flammability and vapor pressure (for safety and convenience), low melting point (enabling use at low temperatures, even below 0° C.), and electrochemical inertness over a wide voltage range (appropriate for use inside an electrochemical device). But they add the advantages of increased solubility and enhanced transport of dissolved lithium salts.

In another embodiment of the invention, any of the electrolyte disclosed herein is used in an electrochemical cell, such as a battery. The cell has an anode, a cathode, and the electrolyte between the anode and the cathode. The electrolyte provides ionic communication between the anode and the cathode. In one arrangement, the anode is made of lithium metal and alloys, graphite, lithium titanante, silicon and/or a silicon alloy. In one arrangement, the cathode is made of a material such as nickel cobalt aluminum oxide (NCA), nickel cobalt manganese (NCM), LiCoO₂, LiFePO₄, LiNiPO₄, LiCoPO₄, and LiMn₂O₄ particles, and any combination thereof.

EXAMPLES

The following examples provide details relating to composition, fabrication and performance characteristics of lithium-ion electrolytes in accordance with the present invention. It should be understood the following is representative only, and that the invention is not limited by the detail set forth in these examples.

Synthesis of cyclic carbonate-terminated polyfluoropolyether 1: A solution of 1H,1H-nonafluoro-3,6-dioxaheptan-1-ol (28.2 g), epichlorohydrin (18.5 g) and tetrahydrofuran (30 mL) was prepared in a 250 mL flask. At 20 minute intervals, four (4) portions of 1.5 g powdered sodium hydroxide (6.0 g total) were added, with vigorous stirring. The mixture was then heated to reflux for 5 hours. It was then cooled and filtered before removal of solvent on a rotary evaporator. The residue was vacuum distilled to isolate 17 g of the intermediate oxirane (bp ~65° C. @1 torr). 10 g of the intermediate oxirane were charged to a 40 mL vial and purged with dry CO₂ gas (50 mL/min) for 15 minutes. Tetrabutylammonium bromide (100 mg) was added, then the mixture was heated with continued CO₂ bubbling in a 125° C. oilbath for 16 h. The solution was then cooled and washed with hexane (2×10 mL) before vacuum drying to constant weight, leaving 10 g of clear oil, identified by ¹H and ¹⁹F-NMR methods as the desired product containing <1 wt % of residual tetrabutylammonium bromide.

Scheme. Synthesis of 1

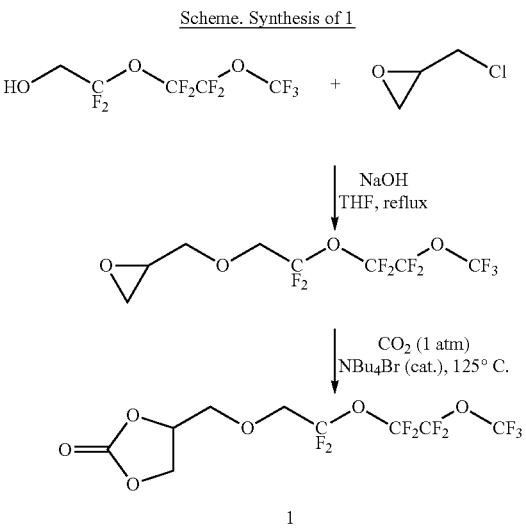

Synthesis of cyclic carbonate-terminated polyfluoropolyether 2: A similar procedure was used as for the synthesis of 1, using 1H,1H-tridecafluoro-3,6,9-trioxadecan-1-ol as the starting material. The product was isolated as a clear oil.

Synthesis of methyl carbonate-terminated polyfluoropolyether 3: A solution of 1H,1H,8H,8H-octafluoro-3,6-dioxaoctane-1,8-diol (10.0 g), triethylamine (8.59 g) and diethyl ether (160 mL) was prepared in a 500 mL flask and chilled in an ice-water bath for 15 minutes. A solution of methyl chloroformate (7.71 g) in diethyl ether (40 mL) was added at 2 mL/min over 20 minutes with continuous stirring and chilling of the reaction flask. The ice bath was removed and the solution was stirred for 16 hours. The reaction was then transferred to a separatory funnel and washed with 2×50 mL 1 M hydrochloric acid, 1×50 mL distilled water, and 1×50 mL saturated aqueous sodium chloride solution. The retained organic layer was dried over magnesium sulfate and filtered before solvent was removed by evaporation leaving a cloudy yellow oil. The oil was washed with 2×10 mL hexane, then redissolved in 30 mL of 2:1 ethyl acetate/ hexane and treated with 0.5 g of decolorizing charcoal for 30 minutes. The charcoal was removed by centrifugation and filtration and the solvent removed by evaporation leaving 12 g of a clear colorless oil, identified by $^1$H and $^{19}$F-NMR methods as the desired product.

Scheme. Synthesis of 3

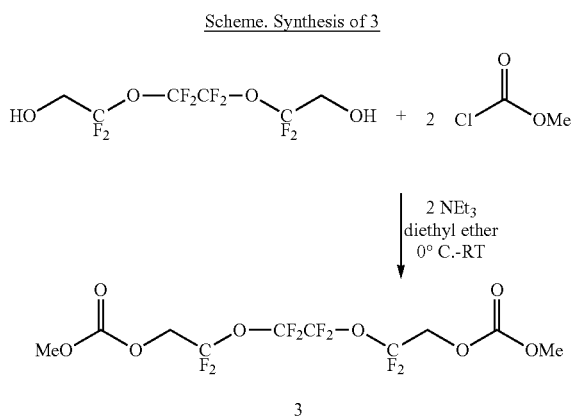

Synthesis of methyl carbonate-terminated polyfluoropolyether 4: A similar procedure was used as for the synthesis of 3, using 1H,1H,11H,11H-perfluoro-3,6,9-trioxaundecane-1,11-diol (10.0 g) as the starting material and adjusting the amounts of other reagents accordingly. The product was isolated as 11 g of a clear oil.

Electrolytes Made from New Materials

Electrolyte solutions were formed by dissolving 10 wt % lithium bis(trifluoromethane)sulfonimide (LiTFSI) in the appropriate liquid. The ionic conductivities of the electrolytes were measured by constructing symmetric coin cells with porous polyolefin separators soaked through with the LiTFSI solution and performing electronic impedance spectroscopy. The results are shown below in Table I. Conductivity results for methyl carbonate-terminated perfluoropolyethers 3 and 4 are shown for comparison.

TABLE I

Ionic conductivities of cyclic carbonate terminated perfluoropolyether-LiTFSI electrolytes

| Electrolyte (with 10 wt % LiTFSI) | Conductivity at 80° C. (S cm$^{-1}$) |
|---|---|
| 1 | 1.6 × 10$^{-4}$ |
| 2 | 8.8 × 10$^{-5}$ |
| 3 | 1.5 × 10$^{-5}$ |
| 4 | 1.5 × 10$^{-5}$ |

Thus, the cyclic carbonate-terminated electrolytes (1 and 2) have ionic conductivities 6 to 10 times greater than those of the methoxycarbonyl-terminated electrolytes (3 and 4) under similar conditions.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. An electrolyte, comprising:
   a mixture of
   perfluoropolyethers, each having one or two terminal cyclic carbonate groups covalently coupled thereto; and
   an alkali metal salt.

2. The electrolyte of claim 1, wherein said alkali metal salt is a lithium salt.

3. The electrolyte of claim 1, wherein said alkali metal salt is a sodium salt.

4. The electrolyte of claim 1, wherein the salt comprises between 5 to 30 wt % of the composition.

5. The electrolyte of claim 1, wherein the perfluoropolyethers are selected from the group consisting of:

wherein x is the mole fraction of difluoromethyleneoxy groups in the perfluoropolyether, and x ranges between 0 and 1;
1-x is the mole fraction of tetrafluoroethyleneoxy groups in the perfluoropolyether, and 1-x ranges between 0 and 1;
n is the average total number of randomly co-distributed difluoromethyleneoxy and tetrafluoroethyleneoxy groups in the perfluoropolyether and n ranges between 1 and 50;
X is either hydrogen or fluorine; and
$R^F$ is a perfluorinated C1-C8 straight or branched alkyl group.

6. An electrochemical cell, comprising:
   an anode;
   a cathode; and
   an electrolyte between the anode and the cathode, the electrolyte in ionic communication with the anode and the cathode;
   wherein the electrolyte is the electrolyte of claim 1.

7. The cell of claim 6, wherein the anode comprises a material selected from the group consisting of lithium metal and alloys, graphite, lithium titanante, silicon, silicon alloys, and combinations thereof.

8. The cell of claim 6, wherein the cathode comprises a material selected from the group consisting of nickel cobalt aluminum oxide (NCA), nickel cobalt manganese (NCM), LiCoO$_2$, LiFePO$_4$, LiNiPO$_4$, LiCoPO$_4$, and LiMn$_2$O$_4$ particles, and any combination thereof.

* * * * *